United States Patent
Takahashi

(10) Patent No.: US 6,434,226 B1
(45) Date of Patent: Aug. 13, 2002

(54) INCOMING CALL CONTROL SYSTEM

(75) Inventor: Satoshi Takahashi, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 08/909,958

(22) Filed: Aug. 12, 1997

(30) Foreign Application Priority Data

Feb. 25, 1997 (JP) ............................................. 9-040901

(51) Int. Cl.[7] .......................... H04M 3/42; H04M 7/00; H04M 11/00; H04L 12/28
(52) U.S. Cl. ....................... 379/201; 370/901; 370/908; 379/93.23; 379/231; 379/242
(58) Field of Search .................................. 379/196, 197, 379/198, 201, 233, 242, 243, 244, 245, 265, 266, 309, 210, 211, 212, 93.01, 93.17, 93.23, 231, 232; 370/901, 908

(56) References Cited

U.S. PATENT DOCUMENTS 5,754,636 A * 5/1998 Bayless et al. .......... 379/245 X
5,940,488 A * 8/1999 DeGrazia et al. ............ 379/201

FOREIGN PATENT DOCUMENTS

| JP | 63-98024 | 4/1988 |
| JP | 2-72755 | 3/1990 |
| JP | 5-10875 | 1/1993 |
| JP | 08125770 A | 5/1996 |

OTHER PUBLICATIONS

Takahiro Kikuchi, "New Products Of Computer Telephony A Wave Of Internet Is Also Here In This Field", In a Japanese Trade Journal entitled "Nikkei Communications", Apr. 1, 1996, pp. 36–38. (A monthly publication).

* cited by examiner

Primary Examiner—Harry S. Hong
(74) Attorney, Agent, or Firm—Helfgott & Karas, P C.

(57) ABSTRACT

In order to realize notification of an incoming call at a client terminal utilizing an existing extension switch system, an exchange of the extension switch system is linked with a server of client terminals such that notification of an incoming call to an extension is made also at a client terminal. Further, whether an incoming call to a client terminal is permitted or not can be changed depending on whether the client terminal is in a log-in state or not. Still further, notification of an incoming call to a client terminal is made by reproducing an audio file or the like to realize a flexible extension call. Further, a response to an incoming call at a client terminal is managed by a timer such that, in case of time out, an ordinary extension rings. Still further, the server is made to have alternative recipient information such that notification of an incoming call is transferred via the server.

7 Claims, 20 Drawing Sheets

FIG. 3

TABLE FOR MANAGING INCOMING CALL MODES

| EXTENSION | CLIENT NUMBER | INCOMING CALL MODE | |
|---|---|---|---|
| #2001 | CL1 | 0 | |
| #2002 | CL2 | 1 | |

~100

TIMER MANAGING DATA 200

FIG. 10

TABLE OF A GROUP OF ALTERNATIVE RECIPIENTS
OF AN INCOMING CALL IN CASE OF FAULT

| GROUP NUMBER | #2002 | |
|---|---|---|
| | TELEPHONE NUMBER 1 (#2003) | ~300 |
| | ⋮ | |
| | TELEPHONE NUMBER n (#2004) | |
| | | |

FIG. 22

```
┌─────────────────────────────────────────┐
│       DETAILED INFORMATION         │ × │
├─────────────────────────────────────────┤
│  ┌────────┐                             │
│  │PICTURE │   NAME:  TARO FUJITSU       │
│  │OF THE  │                             │──221
│  │FACE    │                             │
│  └────────┘                             │
│           COMPANY : _____   │
│        DEPARTMENT : _____   │
│             TITLE : _____   │
│ ADDRESS OF COMPANY : _____   │
│   TELEPHONE NUMBER : _____           │
│   FACSIMILE NUMBER : _____           │
│      MAIL ADDRESS : _____        │
└─────────────────────────────────────────┘
```

FIG. 23

```
┌──────────────────────────────────────┐
│ TRANSFER                             │
│    ┌──────────────────┐              │
│232─│ GROUP 1       ⇩  │           231│
│    ├──────────────────┤              │
│    │ VOICE MAIL       │              │
│    │ GROUP 1          │   ┌────────┐ │
│    │    :             │   │EXECUTION│─233
│    │ GROUP N          │   └────────┘ │
│    │ JIRO FUJITSU     │              │
│    │ HANAKO FUJITSU   │              │
│    │    :             │              │
│    └──────────────────┘              │
└──────────────────────────────────────┘
```

INCOMING CALL CONTROL SYSTEM

BACKGROUND OF THE INVENTION

1. Field of the Invention

The present invention relates to an incoming call control system which is effective when applied to Computer Telephony System (CTI) in which a computer and an exchange are linked to control call connection.

2. Description of the Related Art

In most of conventional private branch exchange systems, extension line communication and line wire communication are carried out with extensions in each of which a handset and a small-sized liquid crystal display are integrally formed.

In an extension of this kind, a called party is notified of an incoming call with stereotyped ringing tone and character information of several characters displayed on a liquid crystal display.

On the other hand, in an office, an office network system has been introduced in which each person is allotted one personal computer and all the personal computers are integratively managed by a LAN.

However, under the existing situation, an extension system and such an office network system described in the above are managed as completely different systems. More specifically, an extension system is managed by a private branch exchange (PBX) while an office network system is managed by a host computer forming a server separately from the extension system.

Therefore, in case an extension rings indicating that there is an incoming call when a person is working at a personal computer terminal (client terminal) on his desk, the person has to turn his eyes from the display of the computer terminal to the liquid crystal display of the extension telephone to confirm, for example, whether the incoming call is from an extension or from a line wire.

Japanese Laid-open Patent Application No. Hei 8-125770 as the related art takes notice of this point and discloses a personal computer with a function as an extension which indicates that there is an incoming call on a display means such as a display.

Japanese Laid-open Patent Application No. Hei 5-108578 also proposes a computer with a built-in telephone and discloses technique to turn call information into a file of a computer.

However, a merely built-in telephone in a personal computer is a precondition for both of the above-described related arts, and no attention is paid to utilization of hardware resources such as an extension exchange and extension telephones which have been already laid in an office.

The present invention is made in view of the above-mentioned circumstances. According to the present invention, an existing extension switch system is utilized. By managing an incoming call to an extension with a LAN server, a client terminal corresponding to the extension is notified of the incoming call, and an operator of the client terminal is notified of the incoming call by a display forming the client terminal displaying that there is the incoming call or by a sound function of the client terminal. Further, the present invention proposes a system in which the notification of an incoming call can be switched depending on whether the client terminal logs in a server or not.

SUMMARY OF THE INVENTION

According to a first aspect of the present invention, an incoming call control system comprises an exchange connected with a plurality of extensions for controlling extension line communication or line wire communication, and a server in which each of a plurality of client terminals having a display means are connected therewith to form a network for sending and receiving outgoing and incoming call information to and from the exchange. The server is provided with a means for making the extensions correspond to the client terminals, respectively, and a means for notifying a client terminal to refer to the means for making the extensions correspond to the client terminals when incoming call information to one of the extensions is received from the exchange and to notify a corresponding client terminal of the incoming call. Further, each of the client terminals is provided with a means for displaying notification of an incoming call to change the status of display on the display means when notification of an incoming call is received from the server.

In this way, since an exchange of an existing extension system is linked with a network server, when there is an incoming call to an existing extension, an operator can recognize it with a change on a display of a personal computer used as a client terminal (LAN terminal) or the like. Therefore, various kinds of display of notification of an incoming call is possible such as display status differing depending on whether the incoming call is from a line wire or from an extension, or display of information of the calling party on the display.

According to a second aspect of the present invention, in the first aspect of the invention, the server is provided with a means for managing an incoming call mode for setting whether an incoming call to a client terminal corresponding to an extension which receives incoming call information from the exchange is permitted or not.

With the means for managing an incoming call mode, whether an incoming call is indicated on a display of a client terminal or an incoming call is indicated by ringing tone of an existing extension can be arbitrarily selected, which permits flexible operation using an existing extension system.

According to a third aspect of the present invention, in the second aspect of the invention, the server is provided with a means for managing log-in to manage log-in of a client terminal connected with a network, such that a client terminal the log-in of which is verified is identified by the means for managing log-in to set such that an incoming call to the client terminal is permitted by the means for managing an incoming call mode.

When a client terminal does not log in the server, for example, when the client terminal is switched off or when the personal computer is used as a stand-alone, an incoming call to the client terminal can be forbidden by the means for managing log-in. In this case, ordinary ringing tone of an extension indicates that there is an incoming call.

According to a fourth aspect of the present invention, in the second aspect of the invention, the exchange is provided with a means for controlling telephones to control a call mode of each of the extensions, such that hand-free call can be set by the means for controlling telephones with respect to an extension in which an incoming call to a client terminal corresponding thereto is permitted by the means for managing an incoming call mode of the server.

When an incoming call to a client terminal (notification of an incoming call is displayed by a change on a display means of a client terminal) is permitted by the server, if the exchange controls the means for controlling telephones to set a hand-free mode with respect to an extension corresponding to the client terminal, an operator can speak over the extension without leaving the display of the client terminal.

According to a fifth aspect of the present invention, in the second aspect of the invention, the exchange is provided with a means for controlling telephones to control a call mode of each of the extensions, such that forbidding of ringing can be set by the means for controlling telephones with respect to an extension in which an incoming call to a client terminal corresponding thereto is permitted by the means for managing an incoming call mode of the server.

When an incoming call to a client terminal (notification of an incoming call is displayed by a change on a display means of a client terminal) is permitted by the server, if the exchange controls the means for controlling telephones to forbid ringing of an extension corresponding to the client terminal, an operator can recognize that there is an incoming call merely with a change on a display of the client terminal without being conscious of the extension.

According to a sixth aspect of the present invention, in the first aspect of the invention, each of the client terminals is provided with a means for reproducing sound to reproduce an audio or visual file held as its own when notification of an incoming call is received from the server.

Since an operator can set an arbitrary audio or visual file to be reproduced when there is an incoming call, more various kinds of notification of an incoming call is possible compared with several kinds of ringing tones prepared in advance in an extension. Further, a dynamic visual file is included in the audio or visual file.

According to a seventh aspect of the present invention, in the fifth aspect of the invention, the exchange cancels the forbidding of ringing of the extension in case response processing at the client terminal or on-hook operation of the extension is not carried out after a predetermined length of time elapses since an incoming call to the client terminal is permitted by the means for managing an incoming call mode of the server and the client terminal is notified of an incoming call.

When the server sets a mode in which an incoming call to a client terminal is permitted, in case response processing at the client terminal or on-hook operation of the extension is not carried out because, for example, an operator is not at his desk, the exchange cancels the forbidding of ringing of the extension. By this, another operator near the extension can recognize that there is the incoming call.

According to the eighth aspect of the present invention, in the first aspect of the invention, the server or the exchange is provided with a means for registering an alternative telephone to receive an incoming call to register an alternative telephone to receive an incoming call other than the extension telephones corresponding to the client terminals, respectively.

When an extension corresponding to a client terminal can not respond due to malfunction or the like, or when the operator using the client terminal is at work somewhere else, the operator can receive an incoming call at another extension registered in the means for registering an alternative telephone to receive an incoming call.

BRIEF DESCRIPTION OF THE DRAWINGS

In the accompanying drawings;

FIG. 3 is an explanatory view showing a table for managing incoming call modes of the embodiment;

FIG. 10 is an explanatory view showing a table of a group of alternative recipients of an incoming call used in Embodiment 5 of the present invention;

FIG. 22 is an explanatory view showing a dialog displaying detailed information when notification of an incoming call is displayed in the present invention;

FIG. 23 is an explanatory view showing an example of displaying a transfer dialog when notification of an incoming call is displayed in the present invention;

DETAILED DESCRIPTION OF THE PREFERRED EMBODIMENTS

Embodiment 1

Figure 1:
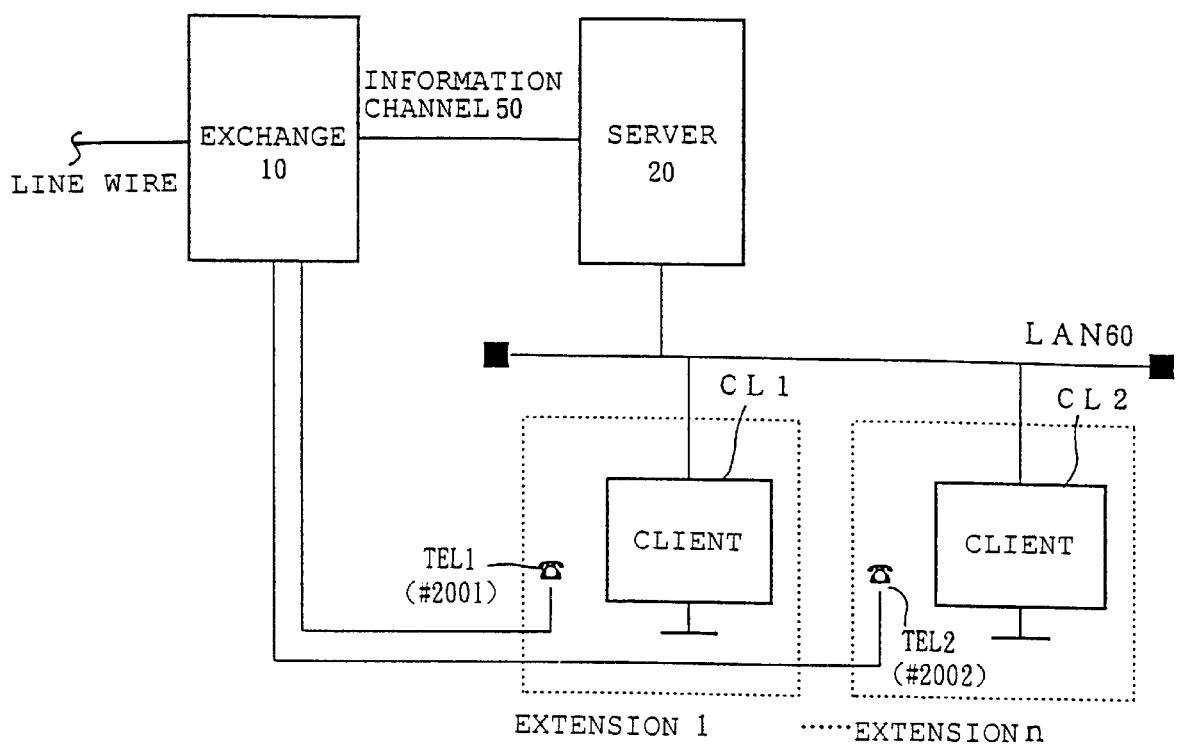
FIG. 1 is a block diagram showing a system structure according to the present invention.

FIG. 1 shows a system structure according to the present invention. An exchange 10 has a plurality of extensions (although only TEL1 and TEL2 are shown here) and controls telephone exchange in extension line communication and line wire communication. TEL1 is allotted an extension #2000 while TEL2 is allotted an extension #2001.

The exchange 10 and the extensions may be formed as an existing private branch exchange system. However, the exchange 10 is preferably capable of controlling ringing and a hand-free mode of the respective extensions. Further, the exchange 10 is provided with an interface (communicating portion 13 with a server which is described later) capable of inputting and outputting outgoing and incoming call information.

A server 20 is connected with a plurality of client terminals (although only CL1 and CL2 are shown in FIG. 1) by a LAN (Local Area Network) to integratively manage office work. The server is connected with the exchange 10 via an information channel 50 formed by serial communication cable and the like. The server 20 is notified of outgoing and incoming call information of the exchange 10 via the information channel 50.

The extensions TEL1 and TEL2 are located near the client terminals CL1 and CL2, respectively, but the client terminals are not directly connected with the extensions.

Figure 19:
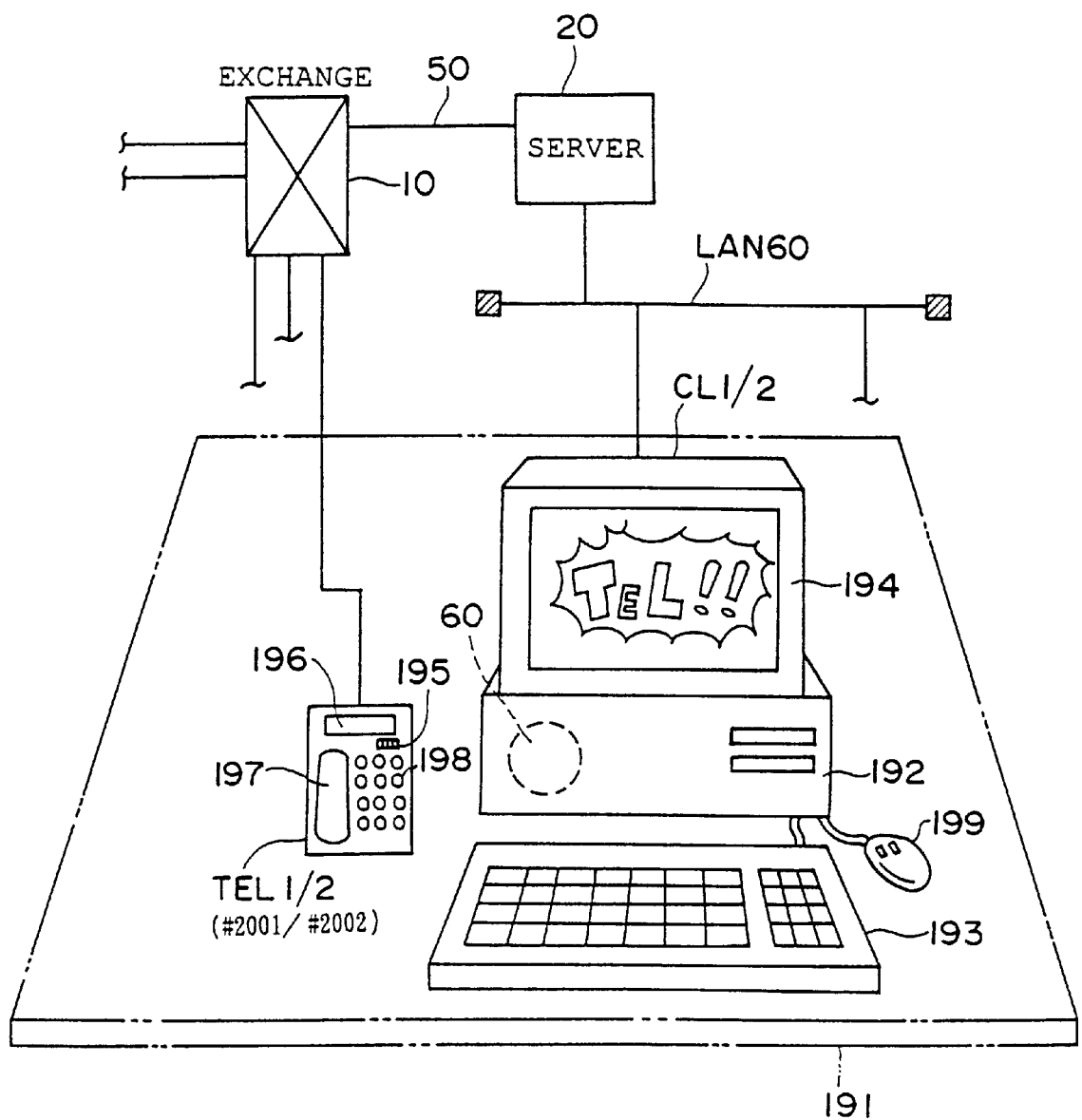
FIG. 19 is an explanatory view where the hardware structure on the side of a client terminal is in a desktop environment of an operator in the present invention.

As shown in FIG. 19, each of the extensions TEL1 and TEL2 comprises a liquid crystal display 196, an indicator lamp 195, dial buttons 198, and a handset 197 provided with a microphone and an earpiece, and may be an ordinary telephone for business use.

In this system structure, although each of the client terminals and the extensions may be commonly used by a plurality of operators, for the sake of convenience, as shown in FIG. 19, it is assumed that there is a set of the client terminal CL1 and the extension TEL1 on a desk 191 of one operator.

Figure 2:
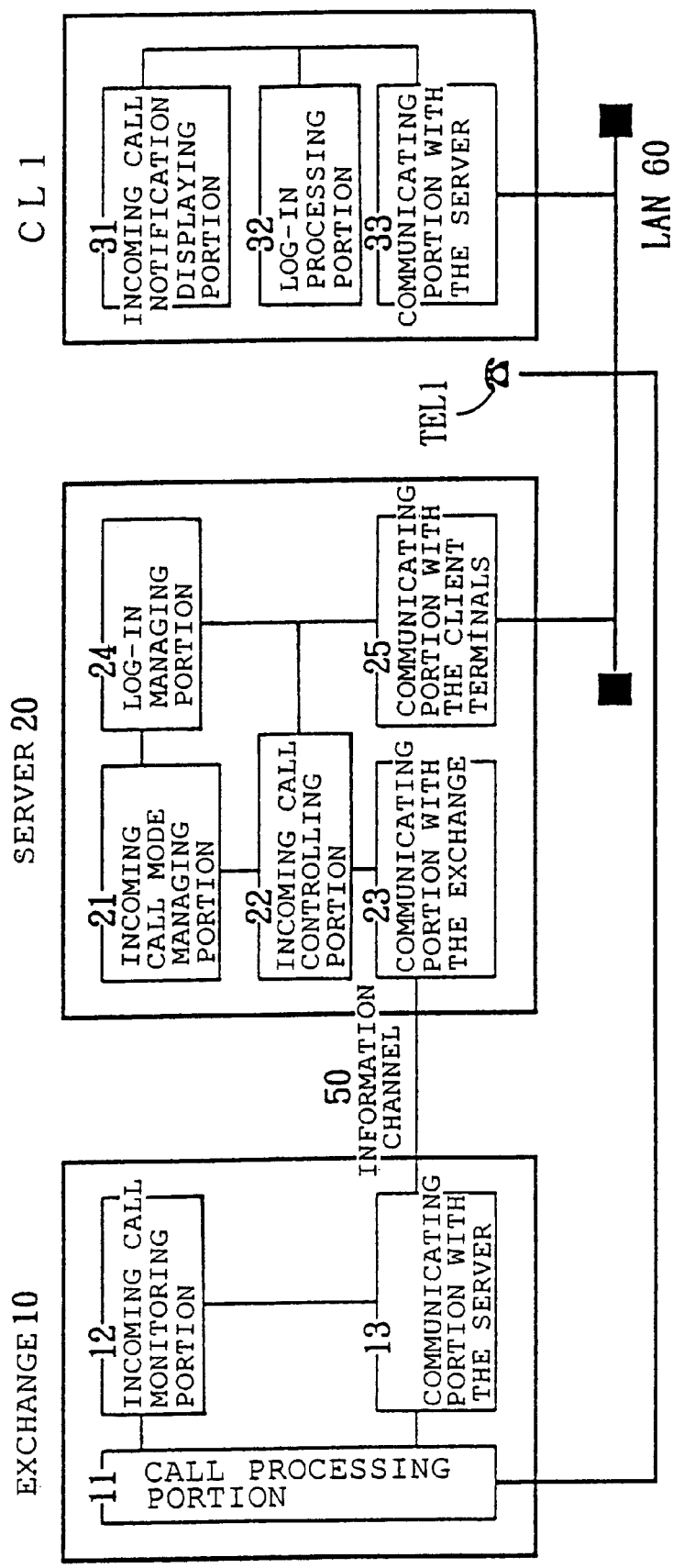
FIG. 2 is a functional block diagram for realizing display of notification of an incoming call at a client terminal according to Embodiment 1 of the present invention.

FIG. 2 shows a functional structure of the exchange 10, the server 20, and the client terminal CL1. Although only the extension TEL1 and the client terminal CL1 are shown in the figure, the other extensions and client terminals are constructed in the same way.

The exchange 10 has a call processing portion 11, an incoming call monitoring portion 12, and a communicating portion 13 with the server, as the main elements thereof. The call processing portion 11 monitors an on-hook/off-hook state of each of the extensions to control outgoing of a call from the extensions for extension line communication or line wire communication. The incoming call monitoring portion 12 monitors an incoming call to extensions thereunder. The communicating portion 13 with the server has a function to, in case the incoming call monitoring portion 12 recognizes an incoming call to an extension thereunder, send the incoming call information thereof (the telephone number of the extension) to the server 20 via the information channel 50.

The server 20 has an incoming call mode managing portion 21, an incoming call controlling portion 22, a communicating portion 23 with the exchange, a log-in managing portion 24, and a communicating portion 25 with the client terminals, as the main elements thereof. The communicating portion 23 with the exchange has a function to, when it receives incoming call information via the information channel 50, notify the incoming call controlling portion 22 that it receives the incoming call information. The incoming call controlling portion 22 manages the overall control of incoming calls. The incoming call mode managing portion 21 has a table 100 for managing incoming call modes as shown in FIG. 3. In the table 100, the telephone numbers of the extensions are made to correspond to the client terminals, respectively. The log-in managing portion 24 manages the log-in status of the respective client terminals via the communicating portion 25 with the client terminals, and has a function to, when the client terminal CL2 normally logs in the server 20, set the incoming call mode of the client terminal concerned in the table 100 for managing incoming call modes to be "1." In other words, in this embodiment, with respect to a client terminal which normally logs in, permission to display notification of an incoming call at the client terminal, that is, to display notification of an incoming call to an extension at the client terminal, is set. Incoming call modes in the table 100 for managing incoming call modes may be arbitrarily set from the side of the client terminals.

Each of the client terminals CL1 and CL2 is a personal computer as shown in FIG. 19, and generally comprises a main body 192, a keyboard 193, a mouse 199, a display 194, and the like.

Each of the client terminals CL1 and CL2 has an incoming call notification displaying portion 31, a log-in processing portion 32, and a communicating portion 33 with the server, as the main elements thereof. The log-in processing portion 32 has a function to notify the server 20 of log-in information such as an ID or a password inputted from an input device such as the keyboard 193 and the mouse 199 via the communicating portion 33 with the server to process the logging in the server 20. The incoming call notification displaying portion 31 has a function to change the status of display on the display 194 when the client terminal concerned CL1 or CL2 is permitted to display notification of an incoming call, so as to notify the operator of an incoming call to the extension.

Figure 11:
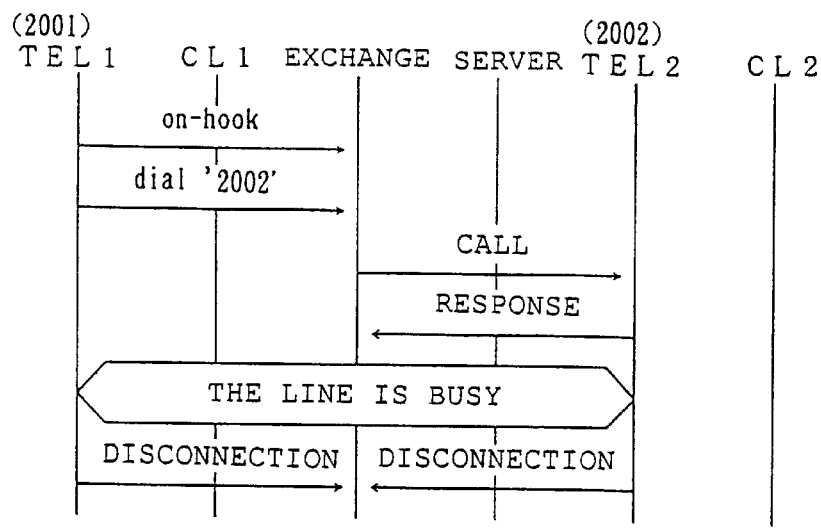
FIG. 11 is a sequence diagram showing an incoming procedure when the client terminal does not log in the server in Embodiment 1 of the present invention.
Figure 12:
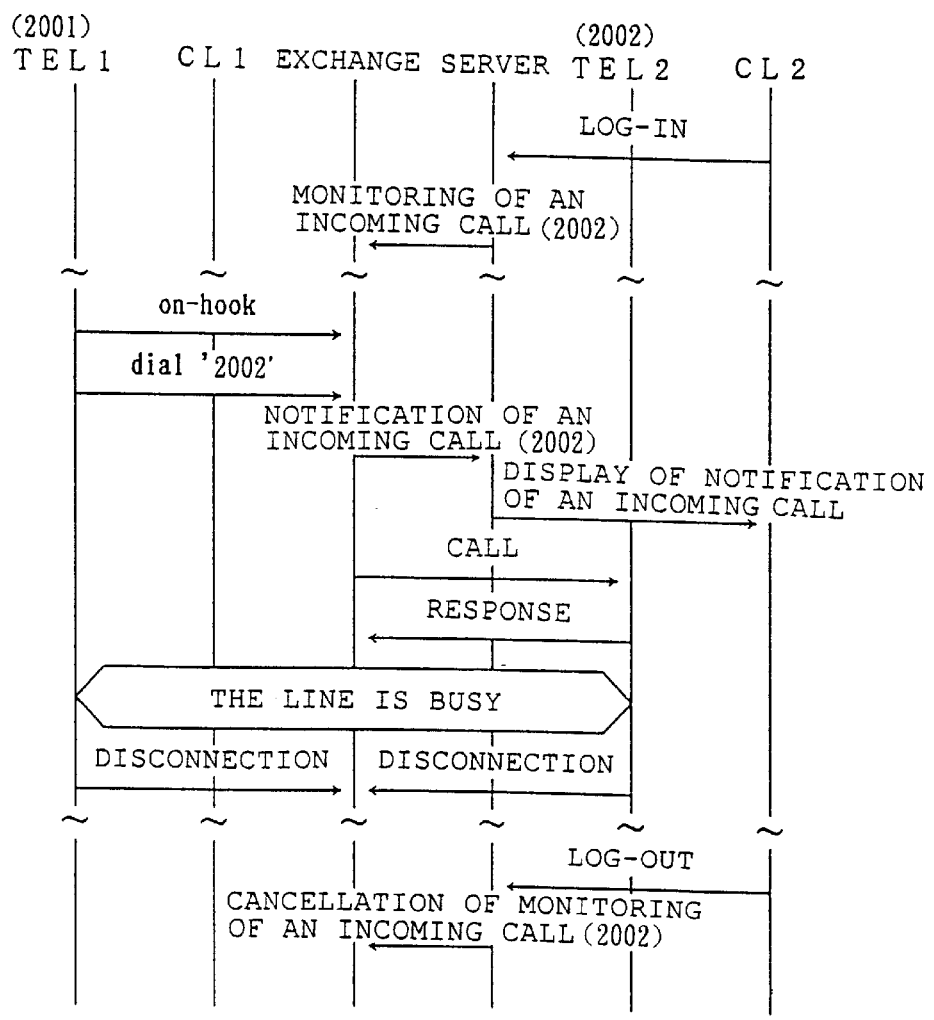
FIG. 12 is a sequence diagram showing an incoming procedure when the client terminal logs in the server in Embodiment 1 of the present invention.

Next, with reference to FIGS. 11 and 12, processing in case there is an incoming call from the extension TEL1 (#2001) to the extension TEL2 (#2002) is described in the following. (In case the client terminal does not log in the server: FIG. 11)

First, when the client terminal CL2 corresponding to the extension TEL2 (#2002) does not log in the server 20, the incoming call mode of TEL2 (#2002) in the table 100 for managing incoming call modes in the server 20 is "0." With this status maintained, when the handset 197 of the extension TEL1 (#2001) is in an on-hook state and "2002," which is the extension number, is dialed, the incoming call monitoring portion 12 of the exchange 10 recognizes through the call processing portion 11 that it is an incoming call to the extension TEL2 thereunder, and sends the incoming call information thereof to the server 20 via the communicating portion 13 with the server and the information channel 50.

In the server 20, the incoming call controlling portion 22 refers to the table 100 for managing incoming call modes in the incoming call mode managing portion 21 based on the incoming call information (#2002). Here, the incoming call mode of the client terminal CL2 corresponding to the extension #2002 is set to be "0" and the client terminal CL2 is in a logout state. So, the incoming call controlling portion 22 recognizes that it is not permitted to display notification of an incoming call at the client terminal, and notified the exchange 10 of no permission to display notification of an incoming call at the client terminal.

In the exchange 10, since the incoming call is not notified at the client terminal, normal extension switch processing is carried out via the call processing portion 11 to directly call the extension TEL2 (#2002) which is the called party. The extension TEL2 (#2002) indicates that there is an incoming call by ringing, and a call between the extension TEL1 (#2001) and the extension TEL2 (#2002) is conducted when an operator on-hooks the handset 197 of the extension TEL2 (#2002). (In case the client terminal logs in the server: FIG. 12)

Next, a case where the client terminal CL2 on the side of the called party logs in the server 20 is described in the following.

When the client terminal CL2 is switched on and the log-in processing with respect to the server 20 is completed, the log-in managing portion 24 of the server 20 notifies the incoming call mode managing portion 21 of the normal log-in. The incoming call mode managing portion 21 sets the incoming call mode of the client terminal CL2 to be "1." This makes the server 20 recognize that the client terminal CL2 is permitted to display notification of an incoming call. Then, the server 20 instructs the incoming call monitoring portion 12 of the exchange 10 to monitor an incoming call to the extension #2002.

Figure 24:
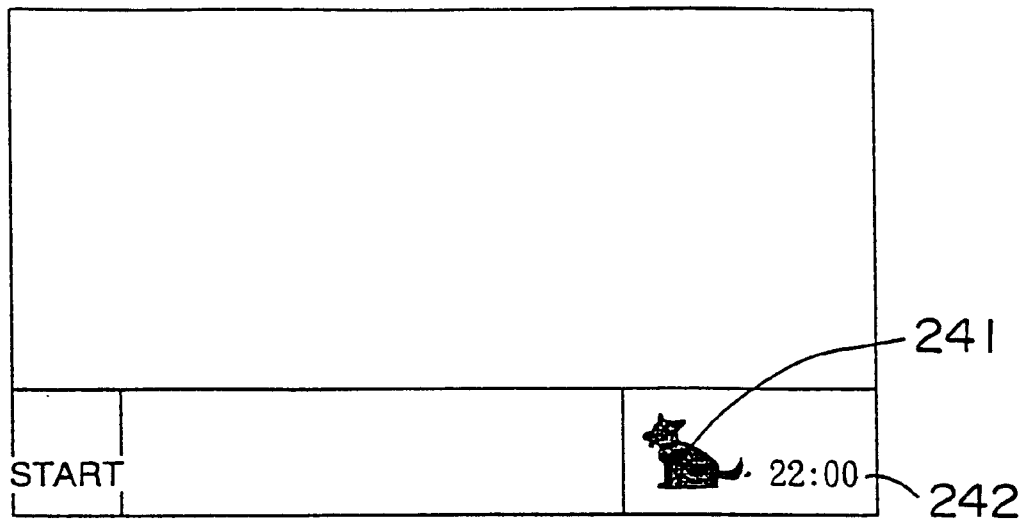
FIG. 24 is an explanatory view showing an example of displaying a symbol icon indicating that the client terminal logs in the server in the present invention.
Figure 25:
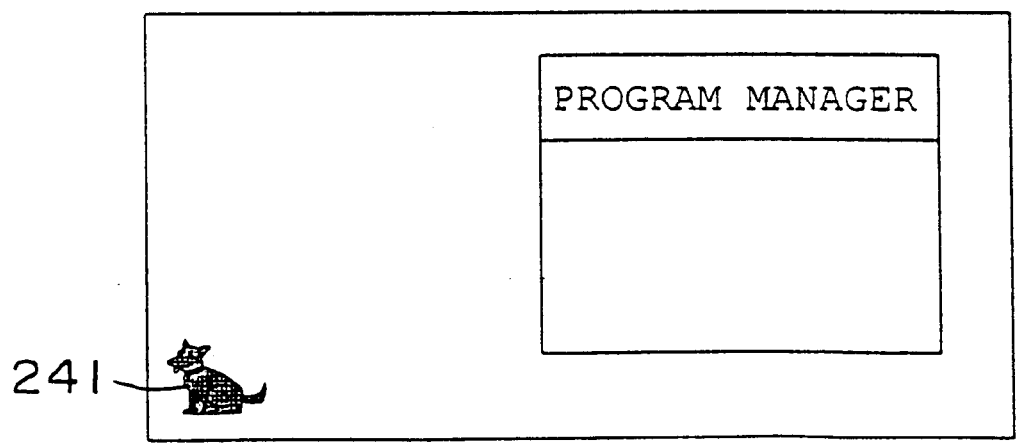
FIG. 25 is an explanatory view showing an example of displaying the symbol icon indicating that the client terminal logs in the server in the present invention.

The existence of the log-in state shown on the display 194 of the client terminal CL2 is shown in FIGS. 24 and 25. In FIG. 24, a figure of a dog is displayed as a symbol icon 241 in a status display region called a task bar 242. This makes the operator capable of visually observing that the client terminal CL2 of his own logs in the server 20. Alternatively, in case of an operation system without the task bar 242, the symbol icon 241 may be displayed at an arbitrary place on the display 192, as shown in FIG. 25.

With the client terminal CL2 normally logging in the server 20 in this way, when the extension TEL1 (#2001) is in an on-hook state and "2002" is dialed, the incoming call monitoring portion 12 of the exchange 10 sends notification of an incoming call (2002) to the server 20. The incoming call controlling portion 22 of the server 20 accesses the table 100 for managing incoming call modes in the incoming call mode managing portion 21 based on the notification of the incoming call (2002). Here, in the table 100 for managing incoming call modes, as shown in FIG. 3, "CL2" is made to be the corresponding client terminal number, and the incoming call mode concerned is "1," that is, permission to display notification of an incoming call at the client terminal is set. Therefore, the incoming call controlling portion 22 instructs the client terminal CL2 to display notification of the incoming call based on the notification of the incoming call (2002) received from the exchange 10. In the present embodiment, together with the display of notification of the incoming call at the client terminal CL2, as shown in FIG. 12, the extension TEL2 is also made to ring by the exchange 10.

Figure 20:
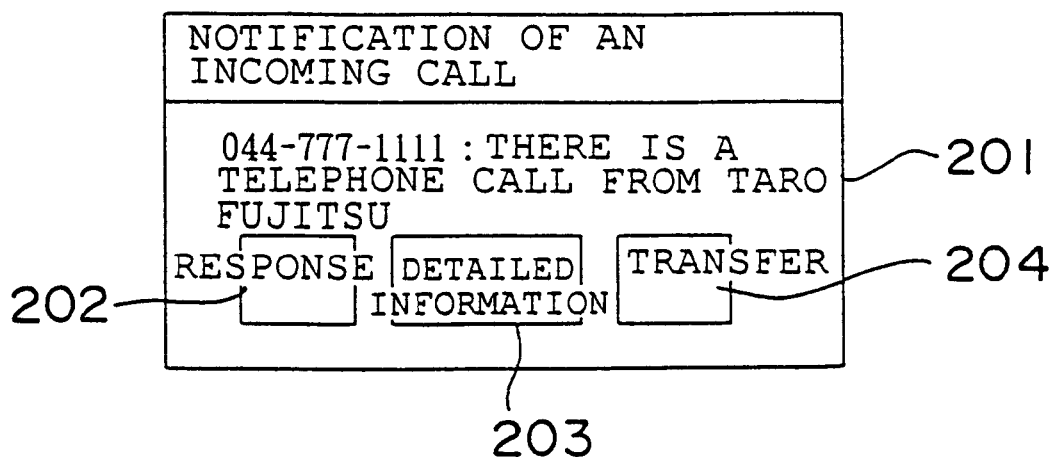
FIG. 20 is an explanatory view showing a dialog as an example of displaying notification of an incoming call on a display of a client terminal in the present invention.

The notification of the incoming call on the display 194 of the client terminal CL2 may be anything that calls the operator's attention, and may be, for example, the graphic display as shown on the display 194 in FIG. 19 or a pop-up type dialog display as shown in FIG. 20.

In the present embodiment, the operator responds to the incoming call by picking up the handset 197 of the extension TEL2 based on the display on the display 194 and by making the extension TEL2 in an on-hook state. When the extension TEL2 is in an on-hook state, a call between the extension TEL1 and the extension TEL2 is made possible.

If the client terminal CL2 gets in a log-out state with respect to the server 20 due to, for example, being switched off, the log-in managing portion 24 of the server 20 detects the log-out state and updates the incoming call mode corresponding to the client terminal CL2 in the table 100 for managing incoming call modes of the incoming call mode managing portion 21 from "1" to "0." This makes the server 20 notify the exchange 10 that the monitoring of an incoming call to the extension (2002) is to be cancelled. After this, an incoming call to the extension TEL2 (#2002) is handled in the same way as described with reference to FIG. 11.

Embodiment 2

Figure 4:
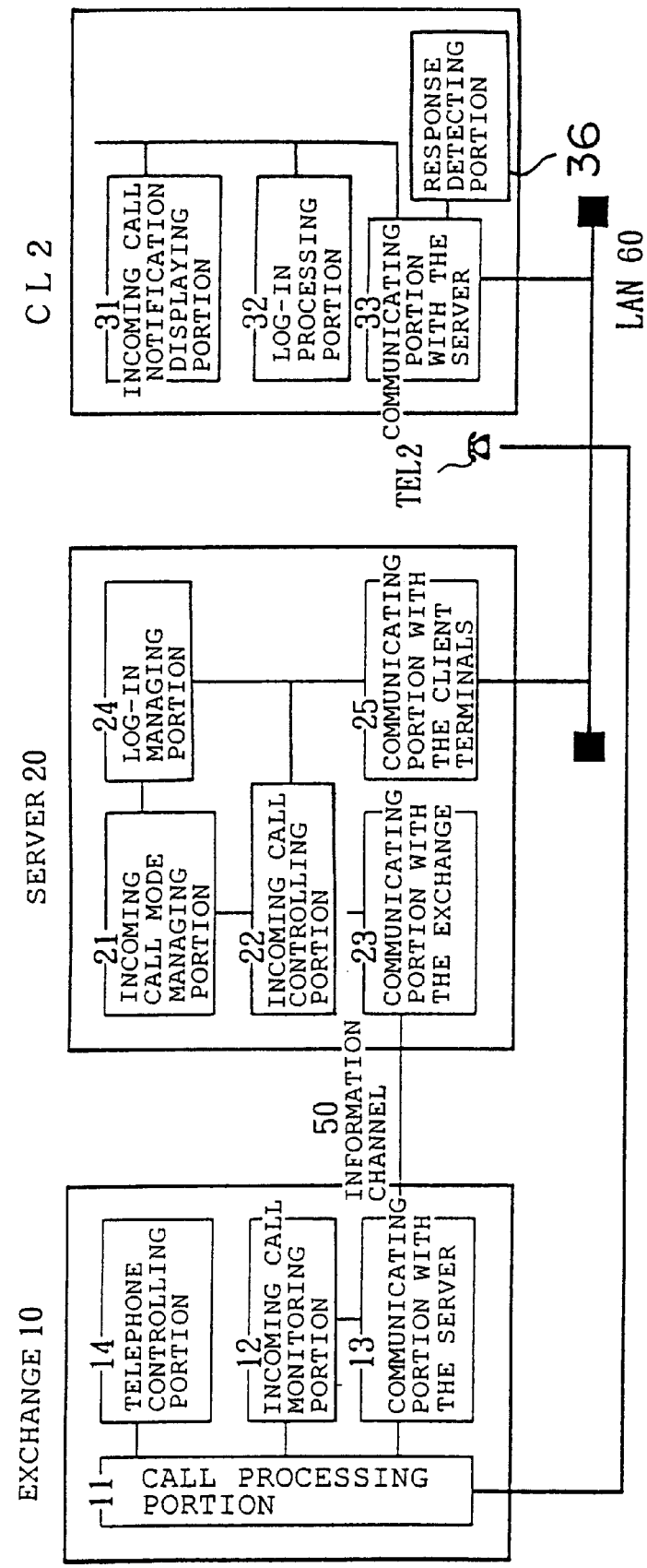
FIG. 4 is a functional block diagram for realizing display of notification of an incoming call at a client terminal according to Embodiment 2 of the present invention.

FIG. 4 shows a system structure according to Embodiment 2 of the present invention. The structure shown in the figure is almost the same as the one shown in FIG. 1 described in Embodiment 1, but is different in that the client terminal CL2 is provided with a response detecting portion 36. The response detecting portion 36 has a function to, when notification of an incoming call is displayed on the display 194, recognize a response to the incoming call with the keyboard 193 or by clicking the icon with the mouse 199 to notify the server 20.

FIG. 20 shows a specific example of displaying notification of an incoming call at the client terminal CL2 according to the present embodiment. This figure shows a popup type dialog 201 displayed on the display 194 indicating that there is an incoming call. By this dialog 201, the operator can be visually notified that there is an incoming call to the extension #2001. It is to be noted that the dialog may flash on and off.

Further, the client terminal CL2 may have a data base to be accessed based on a telephone number of a calling party received from the exchange 10 as incoming call information to thereby display the calling party (in FIG. 20, "Taro Fujitsu") in the dialog 201.

Still further, icons indicating "response" and "transfer" (202 and 204, respectively) may be displayed in the dialog 201. For example, in case the operator clicks the response icon 202, notification of response is given to the exchange 10 via the server 20. A transfer icon 204 has a function to transfer another incoming call to another extension or client terminal.

FIG. 23 shows a transfer dialog 231 which is realized by clicking the transfer icon 204. The transfer dialog 231 is used when the operator is too busy with his work to respond to the call though he knows that there is an incoming call.

In the transfer dialog 231, a group of incoming calls that are transferred is displayed in a pull-down menu 232. The place where an incoming call is transferred can be designated among the items in the menu. After the place where an incoming call is transferred is decided, by clicking an execution icon 233 with the mouse 199, the function to transfer an incoming call to the extension via the exchange 10 by the server 20 is realized.

By clicking a detailed information icon 203, a data dialog 221 as shown in FIG. 22 is displayed to display information of the calling party. Such information is, for example, stored as a data base in a hard disc or the like in the main body 192 of the client terminal CL2. By making the notification of an incoming call have a telephone number of the calling party (in the figure, "044-777-1111") and by carrying out retrieval of the data base with the telephone number being the retrieval key, such information can be easily obtained.

In the structure described in the above, similarly to Embodiment 1, a case where the extension TEL1 (#2001) calls the extension TEL2 (#2002) is described in the following. It is to be noted that in FIG. 13, the first half of the processing is similar to that shown in FIG. 12 and therefore, description thereof is omitted.

The server 20 instructs the client terminal CL2 to display the notification of the incoming call, and the dialog 201 shown in FIG. 20 is displayed on the display 194. At the same time, the exchange 10 directly calls the extension TEL2 (#2002) and makes the extension TEL2 (#2002) ring.

Here, the operator clicks the response icon 202 of the dialog 201 displayed on the display 194 to respond to the incoming call. The responding operation is detected by the response detecting portion 36 and the exchange 10 is notified of this by the server 20. Based on the notification of the response, the call processing portion 11 of the exchange 10 sets the extension TEL2 (#2002) to be in a hand-free mode and to be in an automatically responding state. This makes it possible that the operator talks with the person on the side of the extension TEL1 (#2001) via a microphone and a speaker (not shown) of the extension TEL2 (#2002) with his hands free.

Figure 21:
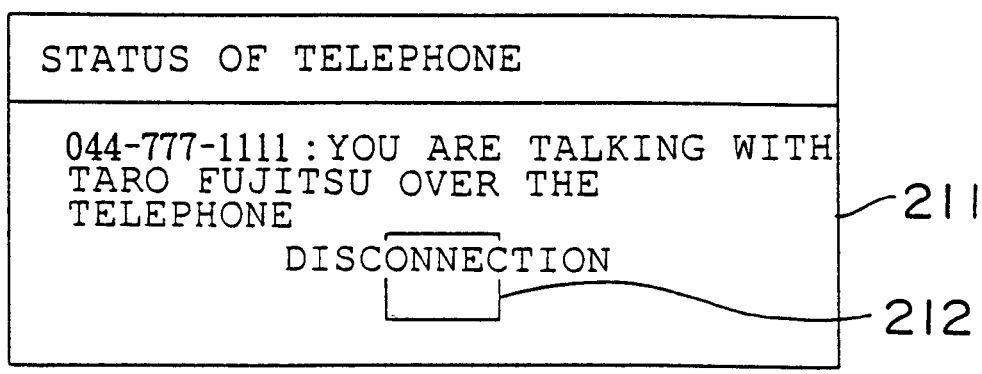
FIG. 21 is an explanatory view showing a dialog when the line is busy in a hand-free mode in the present invention.

In case a response is made by clicking the response icon 202 of the dialog 201 displayed on the display 194, the dialog changes as shown in FIG. 21. A dialog 211 shown in the figure indicates that the line is busy in a hand-free mode. By clicking a disconnection icon 212 in the middle with the mouse 199, the client terminal can have the same function as off-hook operation of the extension TEL2 with respect to the exchange 10 via the server 20.

Figure 14:
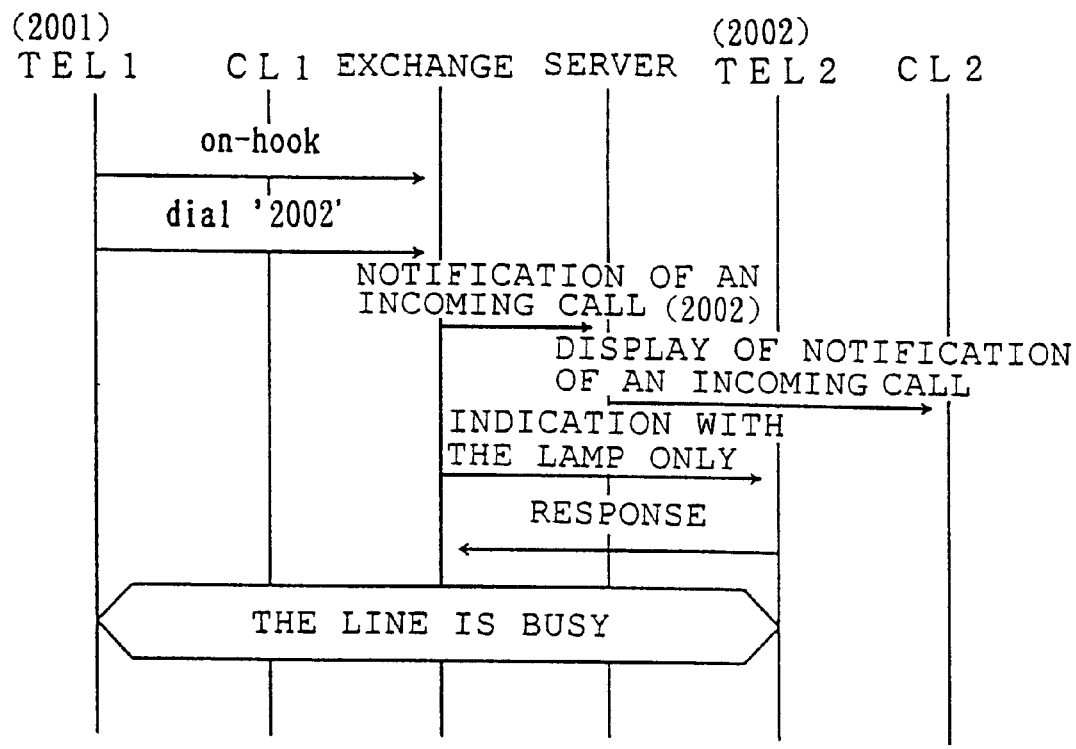
FIG. 14 is a sequence diagram showing an incoming procedure when ringing of the extension is forbidden by the exchange in Embodiment 2 of the present invention.

FIG. 14 is a sequence diagram showing an incoming call to the client terminal in a state that ringing of the extension TEL2 (#2002) is forbidden by the exchange 10. In the figure, the sequence until the extension TEL1 (#2001) is in an on-hook state and notification of an incoming call is displayed on the display 194 of the client terminal CL2 is similar to that described with reference to FIG. 12, and therefore, the description thereof is omitted. In this embodiment, in parallel with the processing by the server 20, the exchange 10 forbids through a telephone controlling portion 14 the extension TEL2 (#2002) to ring but makes the extension TEL2 indicate with a lamp that there is an incoming call. As shown in FIG. 19, the lamp 195 is provided on the extension TEL2 with a light emitting diode or the like as the light source. In this way, by not only making the display 194 of the client terminal CL2 display the notification of an incoming call but also making the extension TEL2 indicate with the lamp that there is an incoming call, notification of an incoming call to the extension can be more reliable.

Then, as shown in FIG. 14, the operator responds to the incoming call to the extension (2002) by picking up the handset 197 of the extension TEL2 (#2002). By this, the exchange 10 realizes a call between the extension TEL1 (#2001) and the extension TEL2 (#2002).

Figure 13:
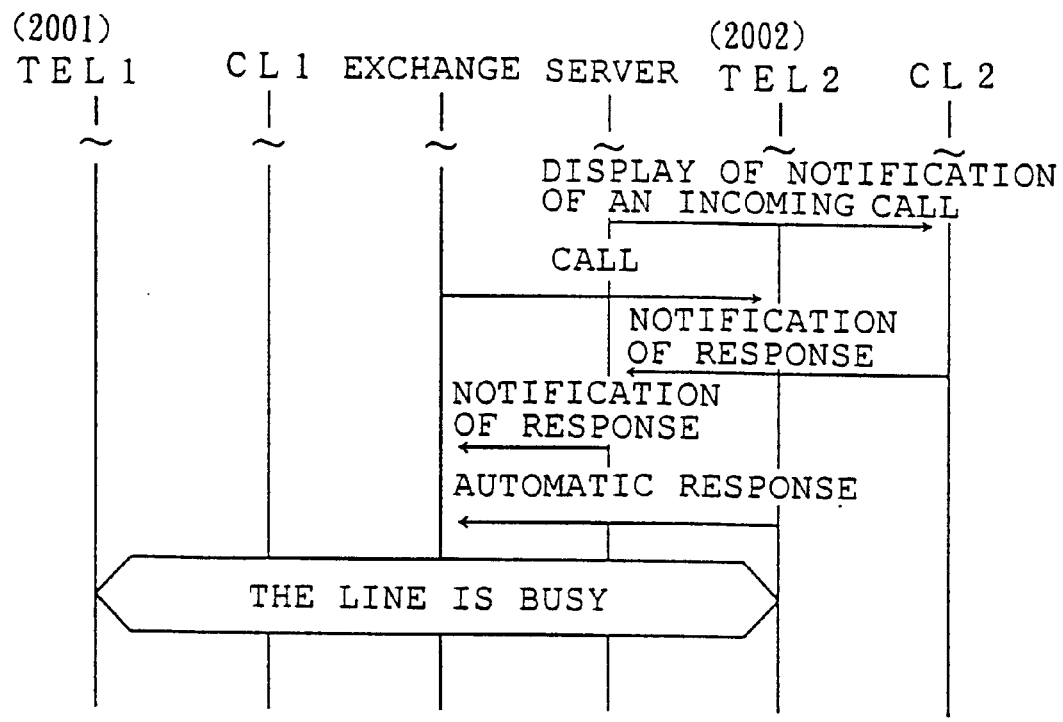
FIG. 13 is a sequence diagram showing a procedure when the client responds to the notification of incoming call in Embodiment 2 of the present invention.

It is to be noted that, though a response to the incoming call to the extension TEL2 (#2002) is made by picking up the handset 197 (on-hook) of the telephone in FIG. 14, as described with reference to FIG. 13, the notification of the response may be made by operating the keyboard, the mouse 199, or the like with respect to what is displayed on the display of the client terminal CL2.

Embodiment 3

Figure 5:
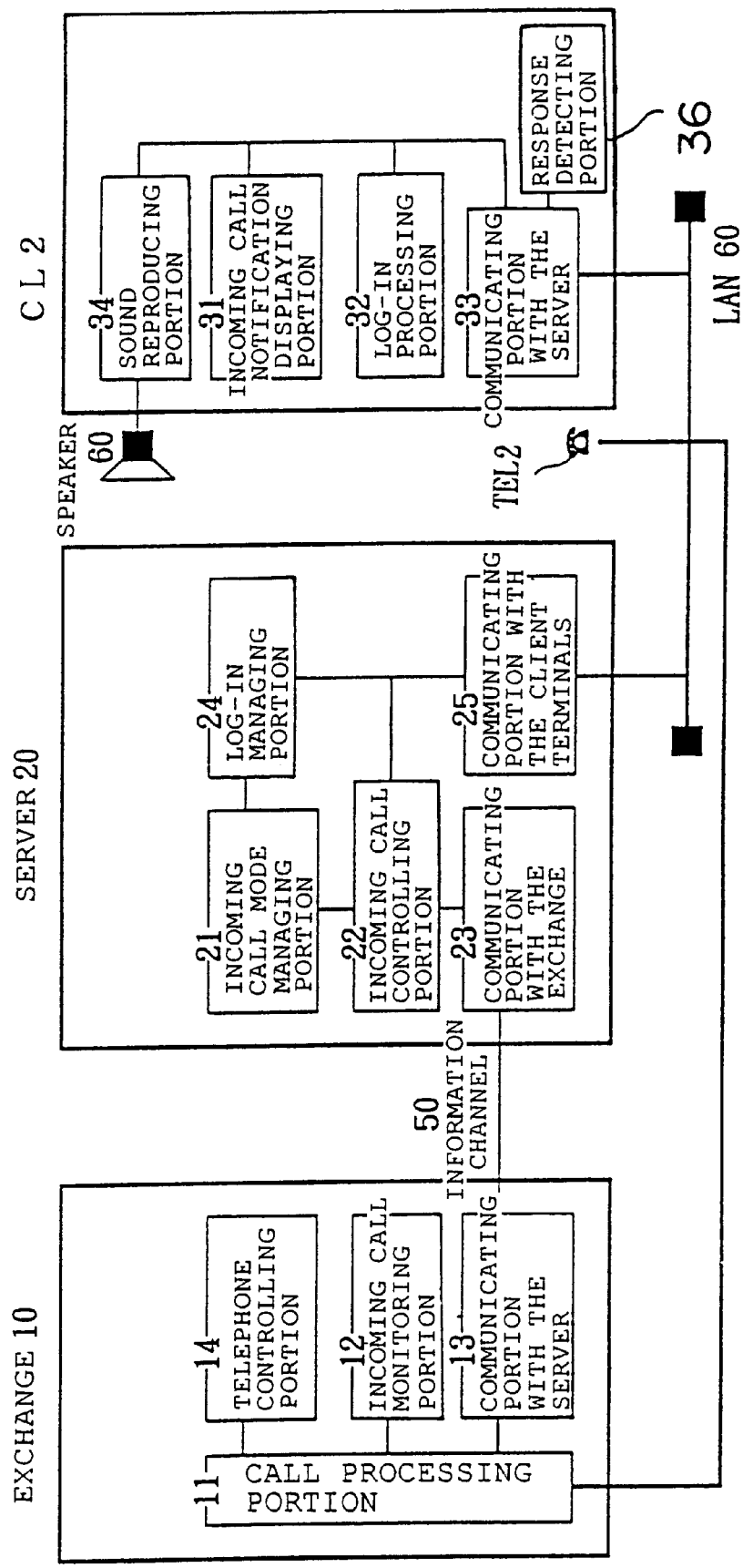
FIG. 5 is a functional block diagram for realizing display of notification of an incoming call at a client terminal according to Embodiment 3 of the present invention.

FIG. 5 shows another embodiment of the present invention. A system structure of the present embodiment is almost the same as the one shown in FIG. 4, but is different in that the client terminal CL2 is provided with a sound reproducing portion 34 and a speaker 60. The sound reproducing portion 34 may have a function to reproduce as a software an audio file such as a WAVE file and a MIDI file provided in an ordinary personal computer. The speaker may be one built in the main body 192 of the computer.

Figure 15:
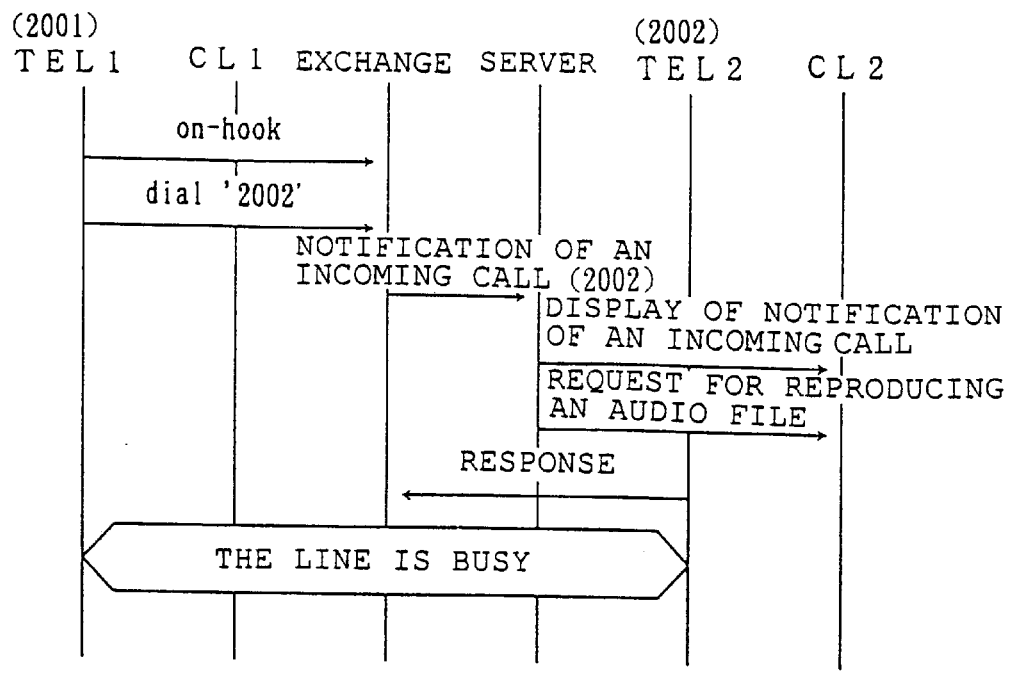
FIG. 15 is a sequence diagram showing a procedure when an incoming call is notified by means of reproducing an audio file at the client terminal instead of ringing in Embodiment 3 of the present invention.

FIG. 15 shows a processing sequence of the present embodiment in a mode where an incoming call to the client terminal is permitted.

When the extension TEL1 (#2001) is in an on-hook state and "2002" is dialed, the incoming call monitoring portion 12 of the exchange 10 sends notification of an incoming call (2002) to the server 20. The incoming call controlling portion 22 of the server 20 accesses the table 100 for managing incoming call modes in the incoming call mode managing portion 21 based on the notification of the incoming call (#2002). Here, in the table 100 for managing incoming call modes, as shown in FIG. 3, "CL2" is made to be the corresponding client terminal number, and the incoming call mode concerned is "1," that is, permission to display notification of an incoming call at the client terminal is set. Therefore, the incoming call controlling portion 22 instructs the client terminal CL2 to display notification of the incoming call based on the notification of the incoming call (2002) received from the exchange 10. In the present embodiment, here, request for reproducing an audio file is also carried out by the server 20. Based on the request for reproducing an audio file, at the client terminal CL2, an audio file held as its own is reproduced at the sound reproducing portion 34 and notification that there is an incoming call is given as audio information from the speaker 60. Such audio information may be human voice saying, for example, "There is a telephone call for you," or may be anything such as music or artificial sound. In this way, the operator can know that there is an incoming call not only by the display of the dialog 201 on the display 194 but also by the sound.

In FIG. 15, a response to the incoming call is made by picking up the handset 197 (on-hook) of the extension TEL2 (2002), but as described in the above with respect to Embodiment 2, the response may be made by clicking the response icon 202 of the dialog 201 displayed on the display 194.

Embodiment 4

Figure 6:
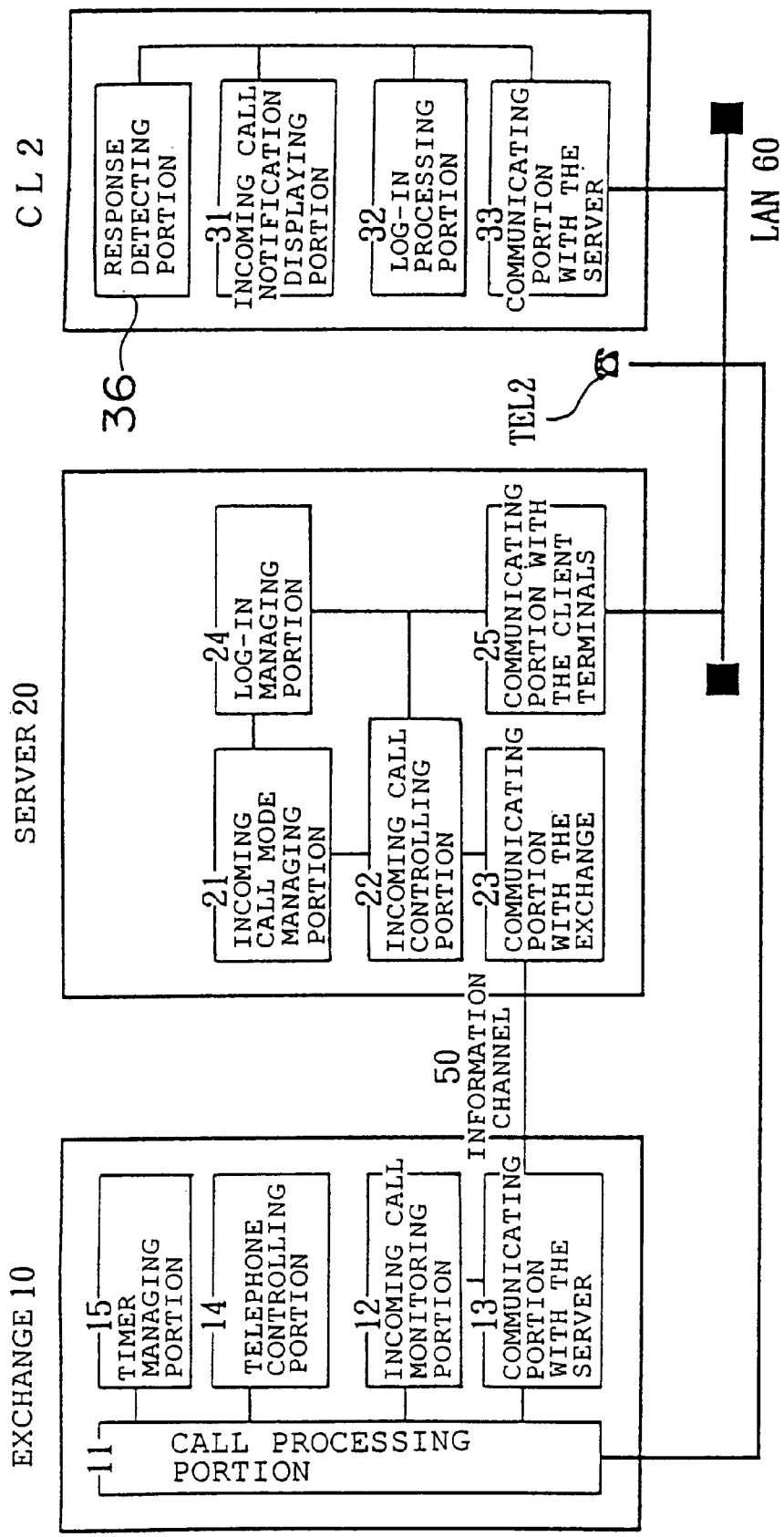
FIG. 6 is a functional block diagram for realizing display of notification of an incoming call at a client terminal according to Embodiment 4 of the present invention.

FIG. 6 shows a system structure of another embodiment. The present embodiment is characterized in that the exchange 10 has a timer managing portion 15. The remaining part of the structure is similar to those of Embodiments 1 to 3 mentioned in the above, and therefore, description thereof is omitted.

The timer managing portion 15 has a timer managing data 200. The timer managing data 200 is set every time there is an incoming call to the extensions, and the telephone number of the extension of the called party (here, #2001) and the calling period are stored. As the calling period, time unit such as for 20 or 30 seconds or for 1 to 3 minutes is registered.

Figure 16:
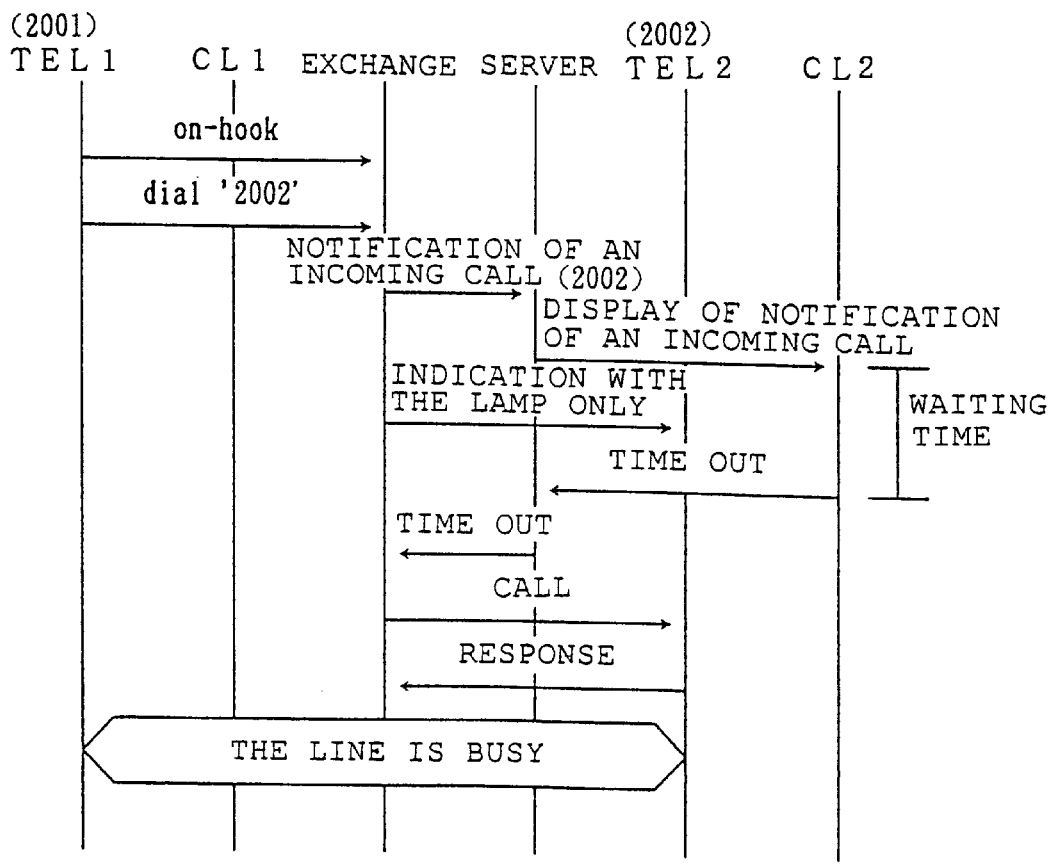
FIG. 16 is a sequence diagram showing a procedure when waiting time for a response to notification of an incoming call is counted by a timer in Embodiment 4 of the present invention.

FIG. 16 is a processing sequence of an incoming call to the client terminal of the present embodiment.

Figure 7:
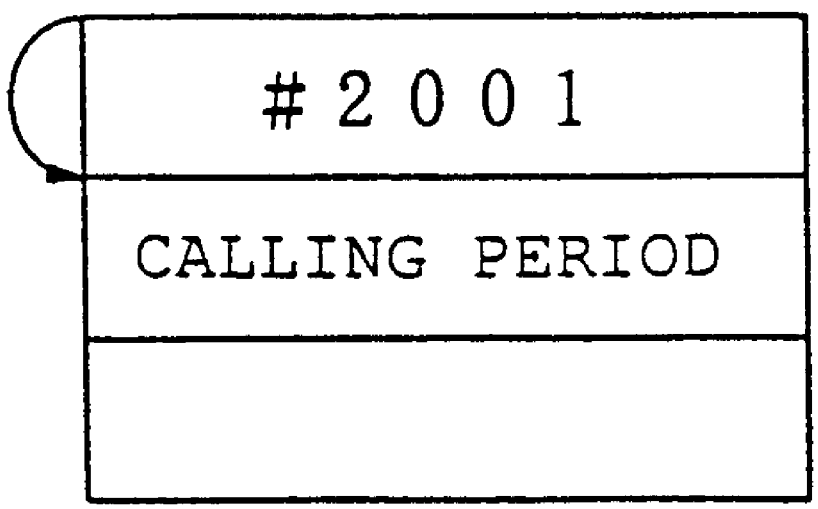
FIG. 7 is an explanatory view showing a timer managing data used in Embodiment 4 of the present invention.

When the extension TEL1 (#2001) is in an on-hook state and "2002" is dialed, the incoming call monitoring portion 12 of the exchange 10 sends notification of an incoming call (2002) to the server 20. At the same time, the incoming call monitoring portion 12 sets the timer managing data 200 of the extension TEL2 as shown in FIG. 7 in the timer managing portion 15. This setting triggers starting of counting by a timer (not shown) in the timer managing portion 15.

When notification of an incoming call (2002) from the exchange 10 reaches the server 20, based on the notification of the incoming call (2002), the table 100 for managing incoming call modes in the incoming call mode managing portion 21 is accessed. Here, in the table 100 for managing incoming call modes, as shown in FIG. 3, "CL2" is made to be the corresponding client terminal number, and the incoming call mode concerned is "1," that is, permission to display notification of an incoming call at the client terminal is set. Therefore, the incoming call controlling portion 22 instructs the client terminal CL2 to display notification of the incoming call based on the notification of the incoming call (2002) received from the exchange 10. In the present embodiment, ringing of the extension TEL2 is forbidden by the control of the telephone controlling portion 14 of the exchange 10, and notification that there is an incoming call is made only by flashing on and off of the lamp 195.

Here, in the timer managing portion 15 described in the above, the time period until response processing at the client terminal CL2 or on-hook of (response at) the extension TEL2 is carried out is being counted. In case the response processing or response at the extension TEL2 is not carried out within the time period set as the calling period of the timer managing data 200, the mode where ringing of the extension TEL2 is forbidden is cancelled via the telephone controlling portion 14 of the exchange 10, and ringing of the extension TEL2 is started.

Alternatively, a timer may be provided in the client terminal CL2 instead of the timer managing portion 15 of the exchange 10 such that the timer starts counting when the server 20 instructs to respond to an incoming call and such that, in case the response processing is not carried out within a set time period, the exchange 10 is notified of the time out via the server 20 as shown in FIG. 16.

Figure 8:
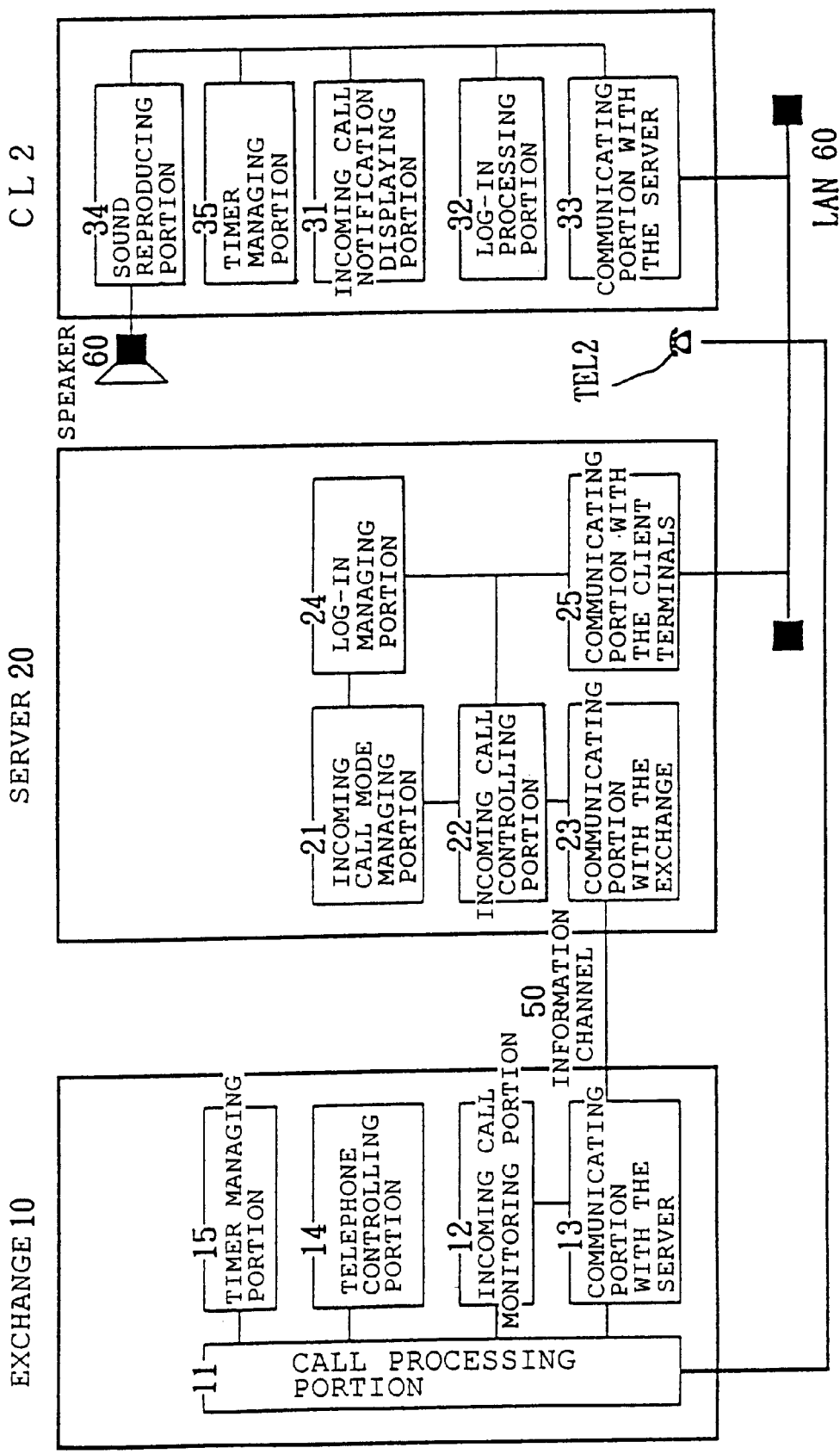
FIG. 8 is a functional block diagram for realizing display of notification of an incoming call at a client terminal as an example of improvement of Embodiment 4 of the present invention.
Figure 17:
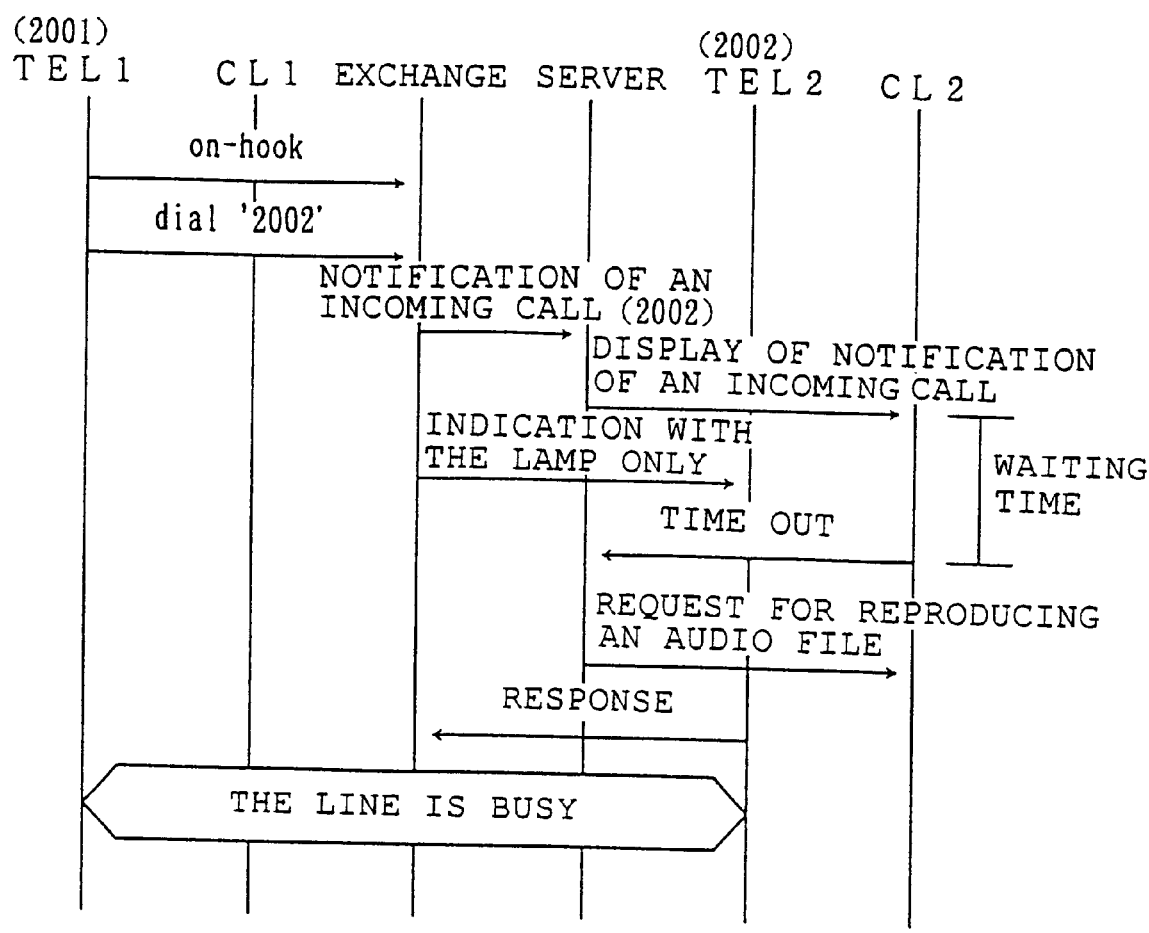
FIG. 17 is a sequence diagram showing a procedure of reproducing an audio file at the client terminal when waiting for a response to notification of an incoming call is time out in the example of improvement of Embodiment 4 of the present invention.

FIG. 8 shows an example of improvement of Embodiment 4. In this example, the client terminal CL2 is provided with the sound reproducing portion 34 to make audio notification via the speaker 60 in case response processing is not carried out within a predetermined time period after notification of an incoming call is displayed on the display 194 of the client terminal CL2. FIG. 17 shows the processing sequence thereof.

More specifically, when the extension TEL1 (#2001) is in an on-hook state and "2002" is dialed, the incoming call monitoring portion 12 of the exchange 10 sends notification of an incoming call (2002) to the server 20. At the same time, the incoming call monitoring portion 12 sets the timer managing data 200 of the extension TEL2 as shown in FIG. 7 in the timer managing portion 15. This setting triggers starting of counting by a timer (not shown) in the timer managing portion 15.

When notification of an incoming call (2002) from the exchange 10 reaches the server 20, based on the notification of the incoming call (2002), the table 100 for managing incoming call modes in the incoming call mode managing portion 21 is accessed. Here, in the table 100 for managing incoming call modes, as shown in FIG. 3, "CL2" is made to be the corresponding client terminal number, and the incoming call mode concerned is "1," that is, permission to display notification of an incoming call at the client terminal is set. Therefore, the incoming call controlling portion 22 instructs the client terminal CL2 to display notification of the incoming call based on the notification of the incoming call (2002) received from the exchange 10. Further, in the present embodiment, ringing of the extension TEL2 is forbidden by the control of the telephone controlling portion 14 of the exchange 10, and notification that there is an incoming call is made only by flashing on and off of the lamp 195.

Here, in the timer managing portion 15 described in the above, the time period until response processing at the client terminal CL2 or on-hook of (response at) the extension TEL2 is carried out is being counted. In case the response processing or response at the extension TEL2 is not carried out within the time period set as the calling period of the timer managing data 200, the server 20 requests the client terminal CL2 to reproduce an audio file. In this way, in case a response is not made within a predetermined time period, in this embodiment, ringing of the extension TEL2 can be resumed or notification of an incoming call can be made as audio information at the client terminal CL2.

Also with respect to the modified example of the embodiment described with reference to FIG. 8, a timer may be provided in the client terminal CL2 instead of the timer managing portion 15 of the exchange 10 such that the timer starts counting when the server 20 instructs to respond to an incoming call and that in case the response processing is not carried out within a preset time period, the exchange 10 is notified of the time out via the server 20 as shown in FIG. 16.

Embodiment 5

Figure 9:
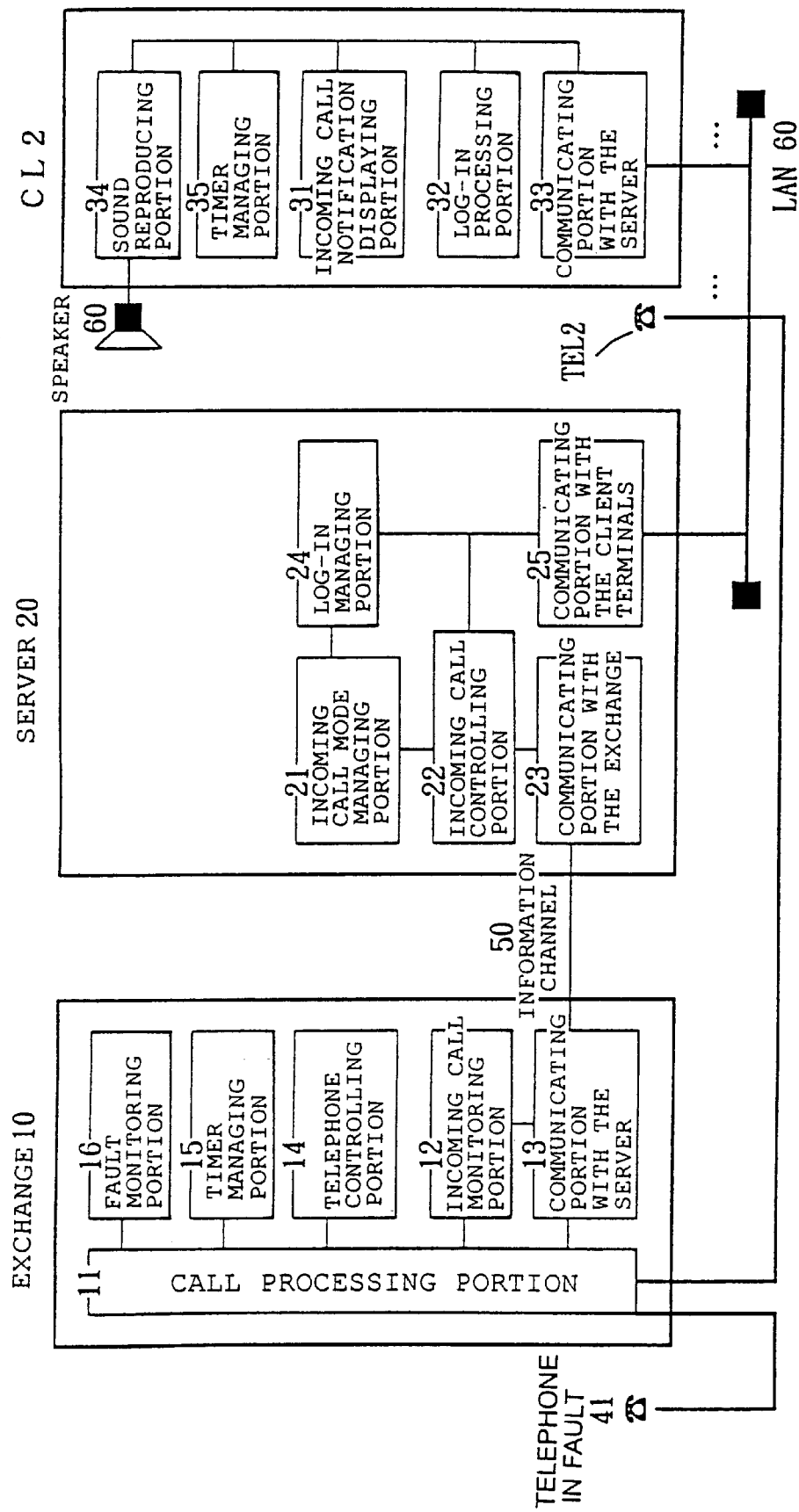
FIG. 9 is a functional block diagram for realizing display of notification of an incoming call at a client terminal according to Embodiment 5 of the present invention.

FIG. 9 shows a system structure of still another embodiment of the present invention. In the figure, the exchange 10 is provided with a fault monitoring portion 16. The fault monitoring portion 16 manages fault information of extensions under the exchange 10. The exchange 10 or the server 20 is provided with a table 300 of a group of alternative recipients of an incoming call as shown in FIG. 10. In the table 300 of a group of alternative recipients of an incoming call, a group number (here, #2002) and alternative telephone numbers to receive an incoming call to the number (telephone numbers 1 to n: #2003 to #2004) are registered, such that, in case an extension registered as the group number can not receive an incoming call due to fault, the alternative telephone numbers have a function to notify an alternative extension of the incoming call.

Figure 18:
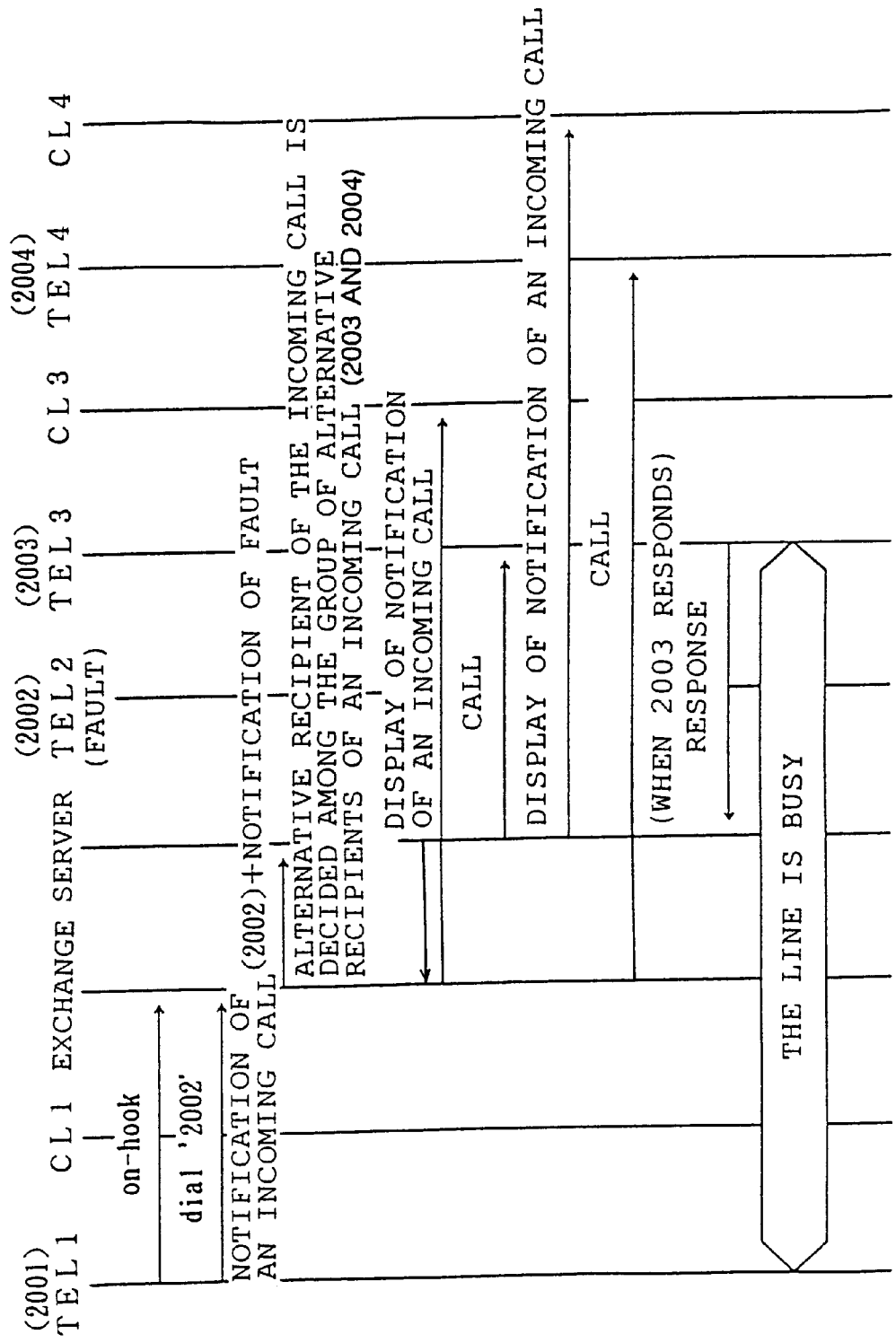
FIG. 18 is a sequence diagram showing a procedure when notification of an incoming call is made by an alternative telephone in Embodiment 5 of the present invention.

FIG. 18 shows the processing sequence of notification of an incoming call by an alternative recipients according to Embodiment 5. Here, when the handset 197 of the extension TEL1 (#2001) is in an on-hook state and "2002" is dialed, the exchange 10 accesses the fault monitoring portion 16 with the extension number "2002" being as the key. When the fault monitoring portion 16 recognizes that there is a fault in the extension TEL2 corresponding to this extension "2002," it sends notification of an incoming call (2002) and notification of the fault to the server 20. The server 20 accesses the table 300 of a group of alternative recipients of an incoming call to retrieve alternative extension numbers "2003" and "2004" to receive the incoming call to the extension TEL2. Based on this, the server 20 instructs client terminals CL3 and CL4 corresponding to the extension numbers "2003" and "2004," respectively, to display notification of the incoming call. The display of notification of the incoming call is similar to that described in Embodiments 1 to 4, and therefore, description thereof is omitted.

The exchange 10 makes ring the extensions TEL3 and TEL4 which are retrieved by the server 20 as alternative recipients of the incoming call. In case either of the extensions (in FIG. 18, TEL3) responds, a call between the extension which has responded (TEL3) and the extension TEL1 which is the calling party is started.

Though Embodiment 5 is described in a case where the extensions retrieved from the table 300 of a group of alternative recipients of an incoming call are all together instructed to display notification of an incoming call, alternatively, the extension numbers (client terminals) as alternative recipients of the incoming call may be prioritized to display notification of an incoming call in the order of priority such that, in case a response is not made within a predetermined time period, an extension number (a client terminal) of the next highest priority is instructed to display notification of the incoming call. In this case, the timer managing portion 15 and the timer managing data 200 shown in FIGS. 6 to 9 may be used to count the time out at each of the client terminals.

Further, though Embodiment 5 is described in a case where the table 300 of a group of alternative recipients of an incoming call is utilized as a data base of places where an incoming call is transferred when there is a fault in an extension, the table 300 may be used as a data base of places where an incoming call is transferred when the operator is absent. In this case, the extension CL2 is capable of being set as an absent mode. When the telephone controlling portion 14 recognizes that the extension CL2 which is the called party is set to be in the absent mode, a place where the incoming call is transferred is retrieved from the table 300 of a group of alternative recipients of an incoming call.

Figure 26:
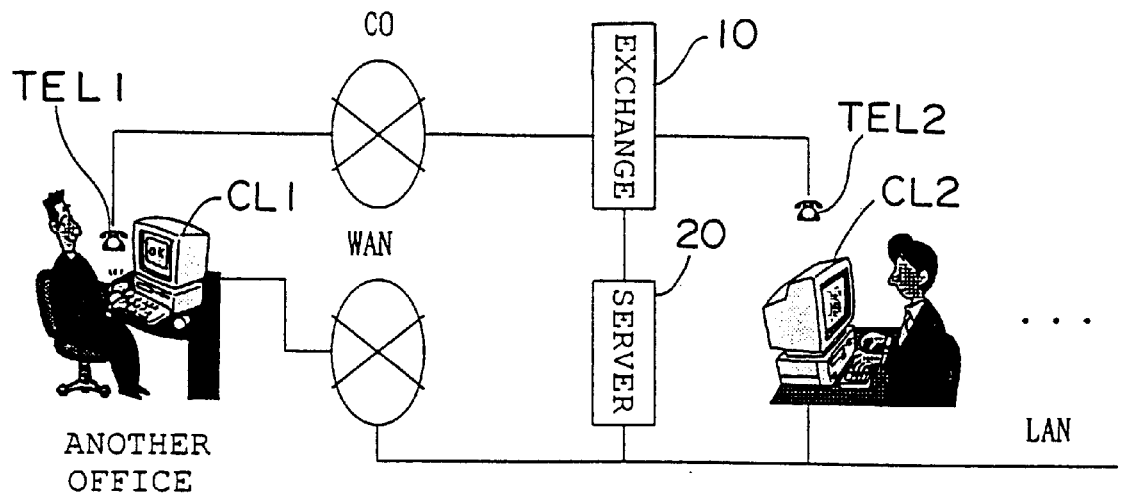
FIG. 26 is an explanatory view showing a case where notification of an incoming call between offices is made using the present invention.
Figure 27:
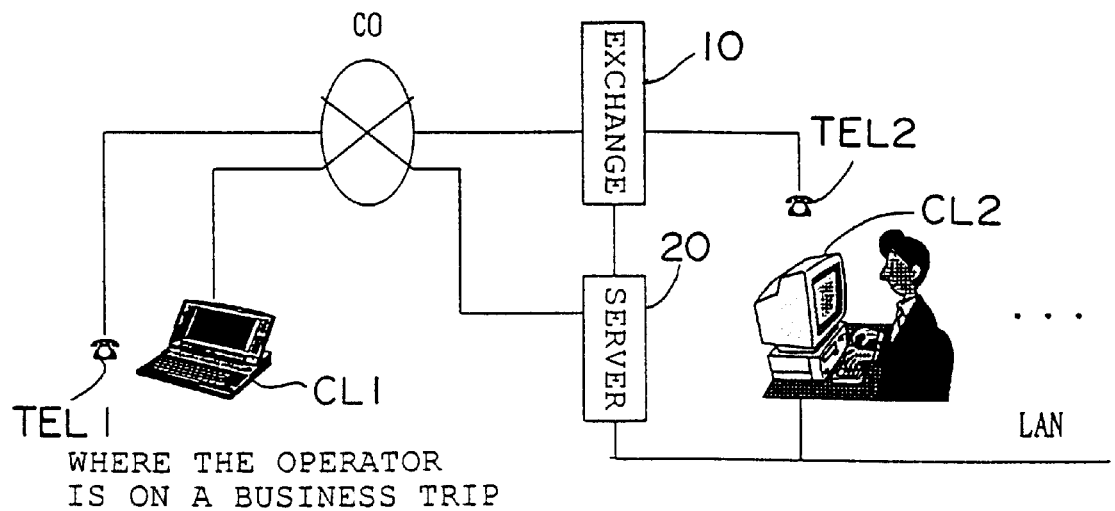
FIG. 27 is an explanatory view showing a case where notification of an incoming call is controlled at the place where the operator is on business trip using the present invention.

FIGS. 26 and 27 show the system structures described in the above when applied to assumed specific business situations.

In FIG. 26, a case where the system structures are extended further to another office. According to the figure, the client terminals CL1 and CL2 which are under different LANs, respectively, are connected together via a WAN. Notification of an incoming call across the WAN is managed by the LAN server 20 on the side of a called party. Though the extensions TEL1 and TEL2 are under different exchanges, respectively, if only the exchange 10 on the side of a called party is linked with the server 20 on the side of a called party, display of notification of an incoming call at the client terminal described in Embodiments 1 to 5 can be realized.

Further, when the operator is on a business trip, if he brings a note type portable computer with him, notification of an incoming call can be displayed at the place where he is. In this case, the client terminal CL1 he has when he is on business trip accesses the server 20 via public telephone service. Further, in this case, by rewriting the table of a group of alternative recipients of an incoming call registered in the server 20 by accessing the server 20 from where he is on business trip, he can see the display of notification of an incoming call to his extension where he is on business trip.

In this way, according to the present invention, since notification of an incoming call to an extension at a client terminal can be made through a server linked with an exchange, notification of an incoming call at a client terminal can be made utilizing an extension switch system as it is, and thus, a flexible extension switch system can be realized.

What is claimed is:

1. An incoming call control system comprising:

an exchange connected with a plurality of extensions for controlling extension line communication or line wire communication;

a plurality of client terminals each of which having display means;

a server with which said plurality of client terminals are connected to form a network for sending and receiving outgoing and incoming call information to and from said exchange, said server being provided with means for making said extensions correspond to said client terminals, respectively, and means for notifying a client terminal to refer to said means for making said extensions correspond to said client terminals when incoming call information to one of said extensions is received from said exchange and to notify a client terminal corresponding to said extension of the incoming call, ringing at said extension is not produced when a corresponding terminal is reproducing sound, and ringing at said extension is produced when sound is not reproduced, and each of said client terminals being provided with means for displaying notification of an incoming call to change the status of display on said display means when notification of an incoming call is received from said server, wherein said server is provided with means for managing an incoming call mode and a call mode for an incoming call to a client terminal, corresponding to an extension which receives incoming call information from said exchange, is arbitrarily set from the side of the client terminals.

2. An incoming call control system as claimed in claim 1, wherein said server is provided with means for managing log-in to manage log-in of a client terminal connected with said network, such that a client terminal the log-in of which is verified is identified by said means for managing log-in to set such that an incoming call to said client terminal is permitted by said means for managing an incoming call mode.

3. An incoming call control system as claimed in claim 1, wherein said exchange is provided with means for controlling telephones to control a call mode of each of said extensions, such that hand-free call can be set by said means for controlling telephones with respect to an extension in which an incoming call to a client terminal corresponding thereto is permitted by said means for managing an incoming call mode of said server.

4. An incoming call control system as claimed in claim 1, wherein said exchange is provided with means for controlling telephones to control a call mode of each of said extensions, such that forbidding of ringing can be set by said means for controlling telephones with respect to an extension in which an incoming call to a client terminal corresponding thereto is permitted by said means for managing an incoming call mode of said server.

5. An incoming call control system as claimed in claim 4, wherein said exchange cancels said forbidding of ringing of said extension in case response processing at said client terminal or on-hook operation of said extension is not carried out after a predetermined length of time elapses since an incoming call to said client terminal is permitted by said means for managing an incoming call mode of said server and said client terminal is notified of an incoming call.

6. An incoming call control system as claimed in claim 5, wherein each of said client terminals is provided with means for reproducing sound to reproduce an audio or visual file held as its own when notification of an incoming call is received from said server.

7. An incoming call control system as claimed in claim 5, wherein said server or said exchange is provided with means for registering an alternative telephone to receive an incoming call to register an alternative telephone to receive an incoming call other than said extensions corresponding to said client terminals, respectively.

* * * * *